Nov. 20, 1956 M. J. RENQUIST 2,771,319
COMBINATION TRUCK BODY AND FLEXIBLE COVER THEREFOR
Filed March 7, 1955 2 Sheets-Sheet 1
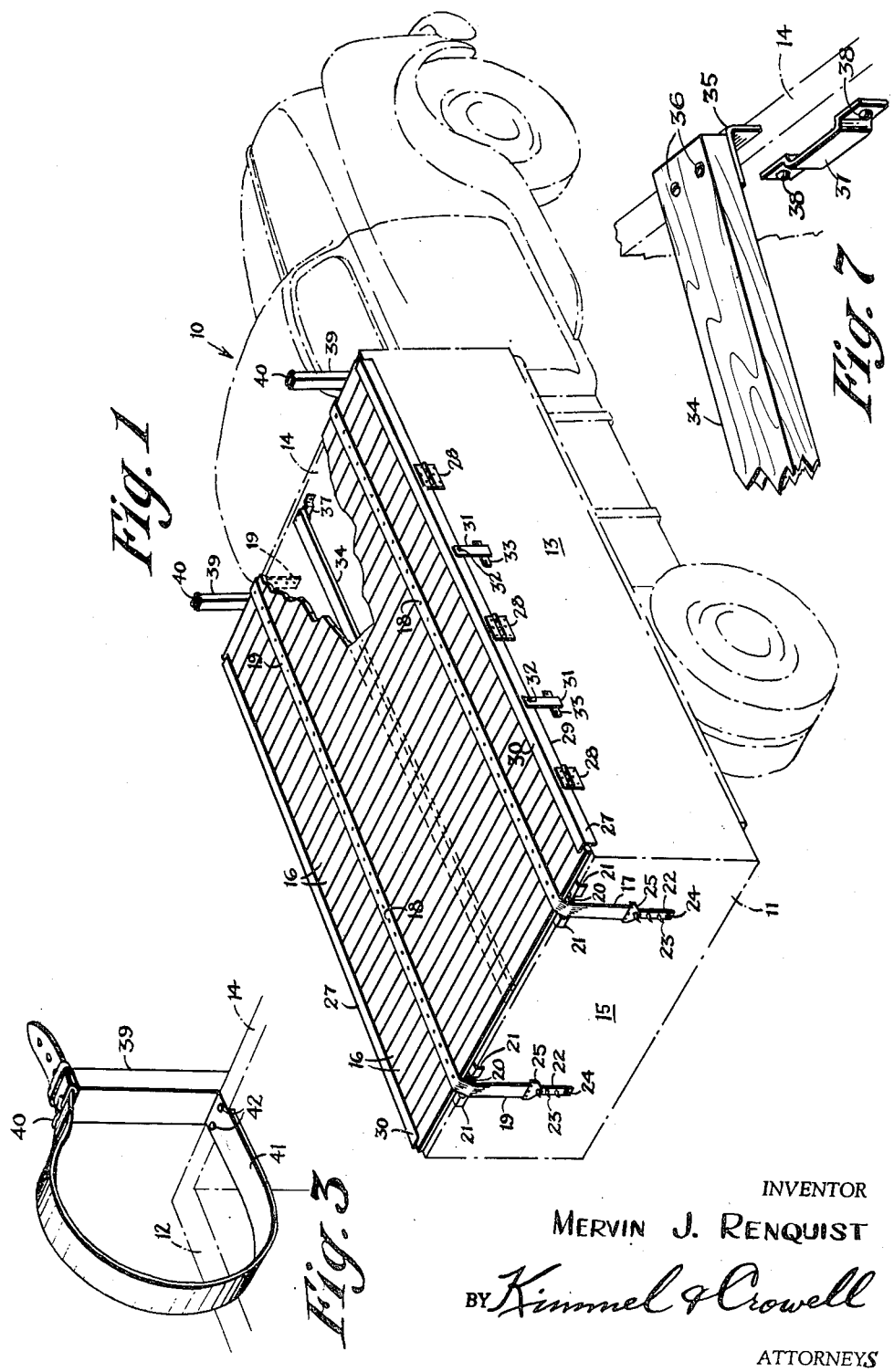
INVENTOR
MERVIN J. RENQUIST
BY Kimmel & Crowell
ATTORNEYS

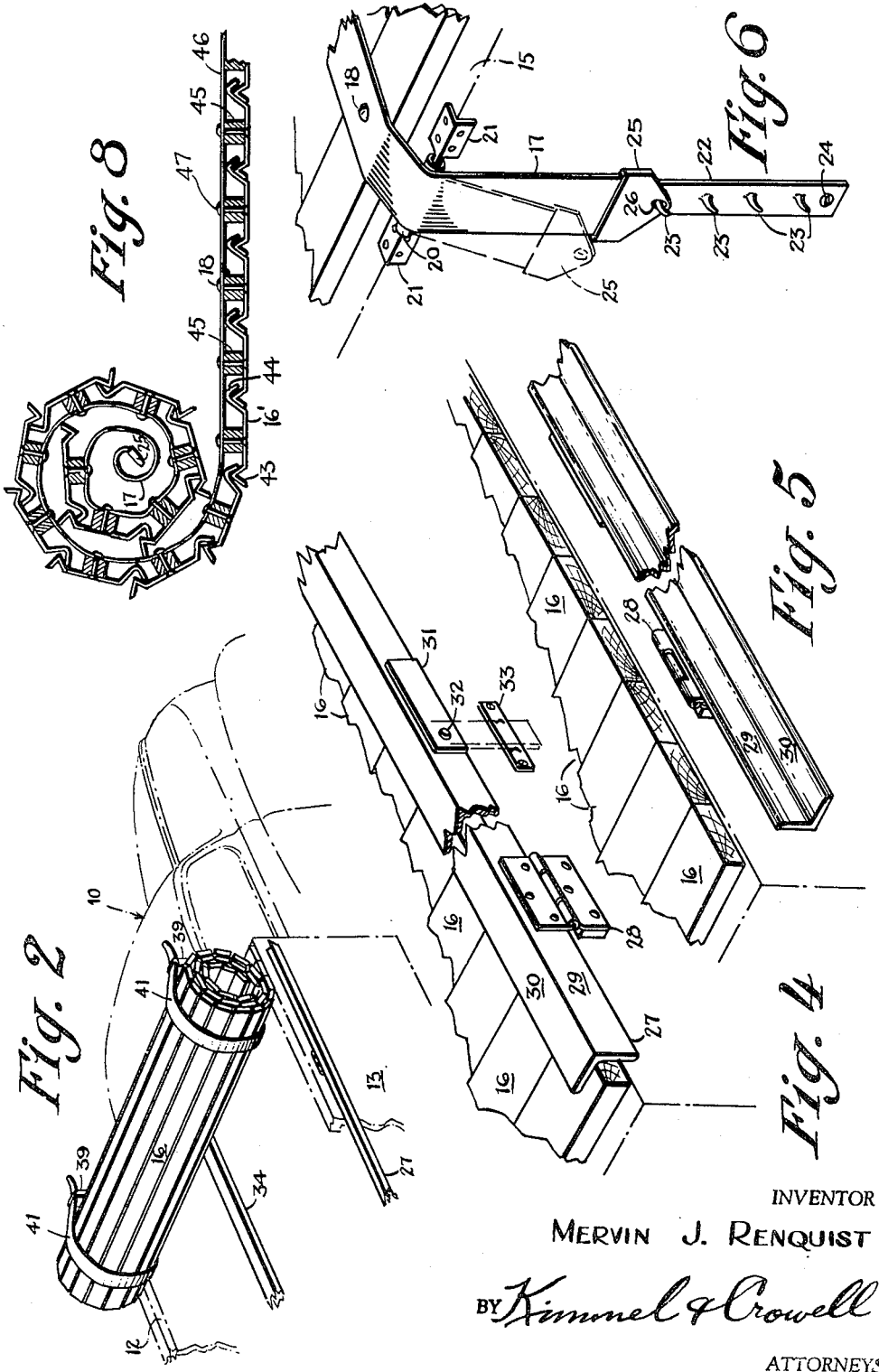

United States Patent Office 2,771,319
Patented Nov. 20, 1956

2,771,319
COMBINATION TRUCK BODY AND FLEXIBLE COVER THEREFOR

Mervin J. Renquist, Julesburg, Colo.

Application March 7, 1955, Serial No. 492,464

4 Claims. (Cl. 296—100)

The present invention relates to combination truck bodies and covers therefor, and more particularly to covers which may be removed and replaced by one man.

The primary object of this invention is to provide an apparatus of the character described which will completely cover the open top of the truck body from end to end and so as to prevent loose contents of the body from being blown therefrom.

Another object of the invention is to provide a device of the class described which may be rolled and stored at one end of the body when the body is empty.

A further object of the invention is to provide a cover for a truck body in which means are provided for holding the longitudinal sides of the cover in engagement with the top edge of the truck body.

Other objects and advantages will become apparent in the following specification when read in light of the attached drawings, in which:

Figure 1 is a perspective view of the invention showing the cover in closed position on a truck body, with parts broken away.

Figure 2 is a perspective view of the cover in stored position on the truck body, with parts broken away.

Figure 3 is a perspective detail view of the roll-storing strap and stake, with parts broken away.

Figure 4 is an enlarged perspective view of the slat hold-down clamp in slat-engaging position, with parts broken away.

Figure 5 is a perspective view of the slat hold-down clamp in released position, with parts broken away.

Figure 6 is a perspective view of the strap keeper and strap roller, showing the strap in attached position, with parts broken away.

Figure 7 is a perspective view of the center support and center support cleat, with parts broken away.

Figure 8 is a longitudinal cross-section of a modified form of the invention, with parts broken away.

Now referring to the drawings in detail, in which like reference numerals indicate like parts throughout the several figures, the reference numeral 10 indicates generally a truck having a generally rectangular body 11 positioned thereon in the normal manner. The body 11 is provided with side walls 12 and 13, front end wall 14 and rear end wall 15. The side walls 12 and 13 and end walls 14 and 15 terminate with their top edges lying in the same horizontal plane.

A series of wooden slats 16 are positioned transversely of the body with their longitudinal edges in abutting relation. A sufficient number of the slats 16 are provided to completely cover the body 11 with their opposite ends resting on the side walls 12 and 13. A flexible strap 17 is secured to the front wall 14, extends over each of the slats 16 to the rear of the body 11, and is secured as at 18 to each of the slats 16. A second strap 19 is secured to the front wall 14 of the body 11 in the same manner as strap 17, and extends over the slats 16 to the rear of the body 11 parallel to the strap 17. The strap 19 is likewise secured to the slats 16 by fastening means 18.

On the outer upper rear edge of the rear wall 15 of the body 11, in alignment with the straps 17 and 19, are a pair of rollers 20 journalled for rotation on bracket members 21 which are secured to the rear wall 15. The rollers 20 are positioned so as to be engaged by the straps 17 and 19 when the cover is in closed position. A pair of keeper members 22 are disposed below the rollers 20 and are provided with a series of arcuately curved hooks 23. The keepers 22 are secured to the rear wall 15 of the body 11 by means of securing elements 24. Each of the straps 17 and 19 is provided at its free end with a keeper engaging buckle 25 having an opening 26 therein which is adapted to engage selectively with one of the hooks 23 on the keeper 22.

At the upper edge of the sides 12 and 13, a clamp 27 is pivotally secured by means of hinges 28 to the outer face of side walls 12 and 13, and is adapted when in its upper position to engage over the end portions of the slats 16 and secure them against movement away from the side walls 12 and 13. The clamp member 27 consists of an angle iron element having one leg 29 extending vertically parallel to the side walls 12 and 13 and the other leg 30 extending inwardly into slat 16 engaging position. A pivoted lock bar 31 is secured to the depending leg 29 of the clamp 27 by means of a pivot 32 and is adapted to engage a keeper 33 secured to the side walls 12 and 13 of the body 11. To disengage the clamp 27 from the slat 16, the keeper 31 is pivoted on its pivot 32 to a position where it overlies the depending leg 29 and is substantially parallel thereto, all as disclosed in Figure 4. Whereupon, the clamp 27 may be rotated on its hinges to a position as disclosed in Figure 5, freeing the slats 16 therefrom.

A bar 34 extends longitudinally of the body 11 at the upper edge thereof and supports the slats 16 at their center. The bar 34 is provided with an angle bracket 35 secured to each end thereof by means of securing elements 36, the angle brackets 35 extending outwardly at right angles to the bar 34. The body 11 is provided on the inner face of its front wall 14 with a cleat 37 secured to the wall 14 by means of securing elements 38, which is adapted to engage with the angle bracket 35 to support the bar 34 in slat 16 supporting position. The opposite end of the bar 34 is provided with an angle bracket (not shown) and a cleat (not shown) is secured to the inner face of the end wall 15 in like manner to the cleat 37 to support the rear end of the bar 34.

At the forward end of the body 11, a pair of stakes 39 extend above the body wall and have secured to the upper ends thereof buckles 40. A strap 41 is secured to the top edge of the front wall 14 by means of securing devices 42 and the straps 41 are adapted to engage through buckles 40 as disclosed in Figure 3. The slats 16 may be rolled, after the straps 17 and 19 are disconnected, into a stake 39 engaging position, as disclosed in Figure 2, whereupon the straps 41 may be drawn about the rolled slats 16 and secured to the buckles 40, holding the roll in stored position.

Figure 8 discloses a modification of the preferred form of the invention, in which metallic strips 16' are used in place of the wooden slats 16. The strips 16' are provided with an inverted V-shaped, longitudinally extending edge element 43, with a second inverted V-shaped member 44 along the opposite longitudinal edge. The V-shaped member 44 is adapted to overlie the V-shaped element 43 with the strips 16' in flat position, as disclosed in Figure 8. Each of the strips 16' is provided with spacer blocks 45 and a strap 46 extends across the tops of the spacer blocks 45 at right angles to the strips 16'. Securing elements 47 connect straps 46, the spacer blocks 45 and the strips 16', securing these elements together. As many straps 46 as are found necessary will be provided across the body 11.

In the use and operation of the invention, the slats 16 are unrolled from stake 39 engaging position with the straps 17 and 19 overhanging the rear wall 15 and in engagement with the rollers 20. Pressure is then applied to the straps 17 and 19 and the straps are hooked over one of the adjustable hooks 23 on keeper 22 to maintain the straps in tight engagement with the slats 16 and the rollers 20. The clamp members 27 are then pivoted about their hinged members 28 into slat 16 engaging position and the lock bar 31 is pivoted to a position at right angles to the clamp 27, so as to engage the keeper plates 33, preventing the clamps 27 from moving from their clamping position. Obviously, the modified form of the invention disclosed in Figure 8 will operate in the same manner as the preferred form above described. It will be noted that the V-shaped members are so arranged that in case of rain the water will drain off and hence the device is waterproof as to any possible accumulations of water therein.

It can be readily seen that the structure above described may be handled by one man without assistance, which makes it possible for grain and other like materials to be hauled in the truck body 11 without the necessity of carrying two or more persons from the point of loading to the point of unloading to assist with the placing and removal of a tarpaulin or other cover normally used.

Having thus described the preferred embodiments of this invention, it should be understood that various modifications may be resorted to without departing from the scope of the appended claims.

What is claimed is:

1. A combination rectangular housing and cover therefor comprising a bottom wall, parallel opposite side walls extending upwardly from said bottom wall, parallel opposite end walls joining the opposite ends of said side walls and extending upwardly from said bottom wall, a plurality of slats each having its opposite ends supported on the respective upper edge of said opposite side walls, said slats being positioned in closely adjacent side to side relation to each other whereby said housing is substantially completely covered, an elongated plate hingedly secured to the outer face of each of said side walls adjacent the upper edges thereof, an elongated member integrally secured to each of said plates and extending perpendicularly therefrom, said members being adapted to overlie the ends of said slats securing said slats against the top edge of said side walls, said plates and said members being adapted to be pivoted outwardly to a position out of contact with said slat ends, means on said side walls for releasably securing said plates and said members in slat overlying position, a flexible connector extending parallel to said side walls, said connector overlying each of said slats, means securing said connector to each of said slats, said connector extending beyond said slats to overlie one of said end walls of said container, means on said one end wall for detachably securing the end of said connector thereto, and means on the other end of said end walls for supporting said slats in rolled position.

2. A device as claimed in claim 1 in which said slats are elongated wooden members having a rectangular cross-section.

3. A device as claimed in claim 1 in which said slats are elongated metallic strips.

4. A device as claimed in claim 1 in which said slats are elongated metallic strips having their longitudinal edges interfitting and overlapping.

References Cited in the file of this patent

UNITED STATES PATENTS

| 1,125,344 | Koch et al. | Jan. 19, 1915 |
| 1,367,240 | Cornell | Feb. 1, 1921 |
| 1,469,542 | Storms | Oct. 2, 1923 |
| 1,728,851 | Blakely | Sept. 17, 1929 |
| 1,790,028 | Stevenson | Jan. 27, 1931 |
| 2,019,379 | Anderson | Oct. 29, 1935 |
| 2,562,209 | Peterson | July 31, 1951 |